United States Patent
Garfinkel et al.

[15] 3,656,923

[45] Apr. 18, 1972

[54] METHOD FOR STRENGTHENING PHOTOCHROMIC GLASS ARTICLES

[72] Inventors: Harmon M. Garfinkel, Horseheads; Loris G. Sawchuk; Stanley D. Stookey, both of Corning, all of N.Y.

[73] Assignee: Corning Glass Works, Corning, N.Y.

[22] Filed: May 27, 1968

[21] Appl. No.: 732,036

[52] U.S. Cl. ...................................65/30, 65/33, 65/37, 65/DIG. 2, 106/47 Q, 106/DIG. 6
[51] Int. Cl. ...................C03c 15/00, C03b 11/08, C03c 3/00
[58] Field of Search ...........................65/30, 33, 37, DIG. 2; 106/47 Q, DIG. 6

[56] References Cited

UNITED STATES PATENTS

| | | | |
|---|---|---|---|
| 3,208,860 | 9/1965 | Armistead et al. | 65/30 X |
| 3,419,370 | 12/1968 | Cramer et al. | 65/30 X |
| 3,287,201 | 11/1966 | Chisholm et al. | 65/30 X |
| 3,357,876 | 12/1967 | Rinehart | 65/30 X |

FOREIGN PATENTS OR APPLICATIONS

| | | | |
|---|---|---|---|
| 950,906 | 2/1964 | Great Britain | 65/30 X |
| 62/2,352 | 3/1962 | Republic of South Africa | 65/30 |

OTHER PUBLICATIONS

Kistler, S. S., " Stresses in Glass Produced by Nonuniform Exchange of Monovalent Ions," J. of Am. Cer. Soc., Vol. 45, No. 2, pp. 59– 68, Feb. 1962.

*Primary Examiner*—Frank W. Miga
*Attorney*—Clarence R. Patty, Jr. and Clinton S. Janes, Jr.

[57] ABSTRACT

This invention relates to the manufacture of glass articles which exhibit photochromic behavior and which exhibit very high mechanical strengths through the development of a surface compression layer therein by an ion exchange process. More particularly, this invention relates to glasses wherein silver halide crystals impart photochromic properties and wherein the ion exchange involves alkali metal and silver ions.

15 Claims, No Drawings

METHOD FOR STRENGTHENING PHOTOCHROMIC GLASS ARTICLES

Two recent developments in the field of glass technology have been the discoveries of photochromic glasses and the ability of alkali metal silicate glasses to be strengthened several fold by means of an ion exchange process. Photochromic glasses exhibit the property of becoming darker in color upon exposure to actinic radiation but return to their original color when the actinic radiation is removed. Hence, the optical transmittance of a photochromic glass varies depending upon the radiation to which it is subjected, these variations in transmittance existing only so long as the actinic radiation impinges upon the glass. For a more complete discussion of the theoretical considerations involved in the mechanism of photochromic glass, reference is made to U.S. Pat. No. 3,208,860. That patent discloses silicate glass compositions having radiation-sensitive silver halide crystals dispersed therein which cause the glasses to darken when subjected to radiations in the untraviolet and lower visible portions of the spectrum, but then permit the glasses to regain their original transmittances when the radiations are removed. It is theorized therein that a reaction occurs between the silver halide crystals and the actinic radiation which alters the absorptive qualities of the crystals to visible radiations. However, since these crystals are dispersed in a glassy matrix, the elimination of the actinic radiation results in the crystals returning to their original state due to the fact that the glassy matrix is non-reactive with, and impermeable to, the reaction products formed upon such exposure and, consequently, these reaction products cannot diffuse away. This ability to transmit more or less visible light depending upon the intensity of actinic radiation thereon has promoted the use of such glasses in windows, opthalmic lenses, and the like.

In the strengthening of alkali silicate glass articles through an ion exchange process, an integral surface layer subjected to compressive stresses is induced on such articles by replacing the alkali metal ion present in a surface layer of the articles with a monovalent cation having a larger ionic diameter such as an alkali metal, copper, silver, or thallium at a temperature such that viscous flow of the glass does not occur. This replacement is accomplished by contacting the glass articles with an external source of the larger diameter cation at an elevated temperature but below the strain point of the glass. The layer subjected to compressive stress is induced in the glass surface by the glass volume trying to increase as ion replacement is effected in the glass structure but, since the exchange is conducted at temperatures below the strain point of the glass, this attempt to increase in volume is prevented due to the glass temperature being too low to allow normal viscous flow thereof at a rate sufficient to release the stresses built up. Hence, the larger diameter ions introduced during the ion exchange are "crowded" into the glass structure. In British Pat. No. 966,733, it is observed that the presence of a substantial amount of $Al_2O_3$, viz., more than 5 percent by weight, in the glass composition insured not only the development of mechanical strength several fold that exhibited by the glass as annealed but also the retention of this strength after the surface of the glass article had been subjected to substantial abrasion. Thus, as is explained therein, the "practical" strength of a glass article requires the measurement thereof after the surface of the article has been exposed to at least moderate abrasion. Hence, the mechanical strength of newly-formed glass articles is frequently very high but usually of very short duration, unless the surface thereof is protected, since normal handling of the articles causes surface damage which drastically reduces this initial strength. Therefore, the mechanical strength of a glass article is generally of little significance unless measured after the surface thereof has been subjected to abrasion to simulate conditions like that which the glass might see in service. Such measurements comprise the "abraded strength" of the glass article and reflect the useful or practical strength of the article. Laboratory tests have demonstrated that the depth of the exchange must be at least 5 microns to impart even nominal abraded strength to the glass articles and depths greater than 25 microns are much to be preferred. This tremendous improvement in abraded strength has promoted the use of such treated glasses in windows, water tumblers, opthalmic lenses, and the like.

The present invention is founded upon the discovery that a particular group of glass compositions can be so treated as to yield articles exhibiting very high mechanical strengths after abrasion and excellent photochromic properties. Such glasses are especially useful as automobile windshields and windows where high resistance to impacts is required and where the photochromic behavior of the glass relieves eye strain for the driver and passengers. We have determined that such high strength and photochromic properties can be obtained through the ion exchange of glass articles having at least a surface layer consisting essentially, in weight percent on the oxide basis, of about 55–65% $SiO_2$, 15–25% $Al_2O_3$, 3–15% $R_2O$, where $R_2O$ consists of 0–5% $Li_2O$ and/or 0–10% $Na_2O$, 0.3–1.5% Ag, and at least one halide in the indicated amount selected from the group consisting of 0.3–5% Cl and 0–1% Br.

Normally, a glass-forming batch of the proper composition to yield a glass falling within the above-recited ranges of constituents in melted and this melt then cooled and shaped to a glass article of a desired configuration. However, as is disclosed in the copending application, Ser. No. 509,164, filed Nov. 22, 1965 now U.S. Pat. No. 3,419,370, and assigned to the present assignee, a glass article having a surface layer exhibiting photochromic behavior due to the presence of silver halide crystals therein can be produced by melting a glass-forming batch containing alkali metal ions and halide ions, but being essentially free of silver ions, and then subjecting the resultant glass to an ion exchange reaction with silver ions from an external source such that silver ions replace alkali metal ions in a surface layer of the glass and, finally, heating at times and temperatures sufficient to react with the halide ions present therein to form silver halide crystals. Thus, silver ions are diffused into the glass by the ion exchange in a sufficient amount to result in the production of enough silver halide crystals in the surface layer to impart photochromic behavior thereto. This manner of producing photochromic glasses is also operable with the base glass composition of the present invention. Nevertheless, since this exchange treatment adds another step in the stream of production, its use, though certainly feasible, is not looked upon very favorably from a commercial point of view.

Table I records glass compositions, expressed in weight percent on the oxide basis, which were melted in platinum crucibles at about 1,400°–1,550° C. for up to about 16 hours. The batch components may comprise any materials, either oxides or other compositions which, when melted together, are converted to the desired oxide composition in the proper proportions.

Various compatible metal oxides and fluorine may be present in the glass but the total of such additions is, preferably, held below 10 percent by weight. Thus, fluorine is well-recognized in the glass making art as a melting aid and as an inhibitor of devitrification as the melt is cooled to a glass. In the instant glasses, fluorine in amounts up to about 3 percent by weight appear to improve photochromic behavior but when present in quantities greater than about 3 percent by weight the mechanical strength of the glass articles is deleteriously affected.

Copper oxide in amounts less than about 0.1 percent by weight, computed as CuO, appears to act as a sensitizer and improves the photochromic properties of the glass.

Other oxides such as MgO, CaO, SrO, BaO, ZnO, $ZrO_2$, $B_2O_3$, and PbO may be included to better the quality of the base glass, to enhance the photochromic behavior of the glass, or to provide certain desired physical properties to the glass over and above photochromic behavior. The use of BaO and/or PbO to adjust the index of refraction of the glass is exemplary of this latter motive. Nevertheless, individual additions should, preferably, not exceed about 5 percent by weight and the sum of all such additions not exceed about 10 percent by weight. The mechanical strength of the final glass is very adversely affected where $B_2O_3$ is present in an amount of 5 percent by weight or more so to obtain any substantial enhancement in strength, the content thereof should be restricted to less than 5 percent by weight.

Since the loss of silver and halide during the melting of the batch ingredients may range from about 25–50 percent by weight, compensation for this factor must be made in compounding the batch ingredients. Because it is not known with which cations the halides are combined in the glass, they are reported in Table I as individual components in accordance with conventional analytical practice. Further, in accordance with conventional practice, silver is recorded as being present as silver metal. The melts were poured into patties about 1 ¼ inches × 1 ¼ inches × 2 mm., these patties being annealed to room temperature to allow visual inspection of the glass quality. The pouring process cooled the melts sufficiently rapidly to prevent devitrification thereof.

These glasses did not demonstrate good photochromic behavior as formed but required a heat treatment to improve this behavior. This heat treatment usually comprises exposing the glass articles in an inert atmosphere, such as air, to a temperature above the strain point of the glass but sufficiently below the softening point thereof so substantial deformation of the glass does not occur. In certain circumstances where sagging of the glass constitutes part of the forming process, e.g., making curved automobile windshields, a heat treatment at or somewhat above the softening point of the glass is practical. This heat treatment functions to enhance the migration of the silver and halide ions leading to greater combination thereof. The period of time necessary for this heat treatment to accomplish the desired precipitation of silver halide is dependent upon the glass composition but generally varies from about ½–12 hours. Longer exposures are possible without deleteriously affecting the photochromic properties but are normally unnecessary and uneconomical. Sometimes, more desirable photochromic behavior is attained where two or more successive short time heat treatments are employed rather than a single long one.

Table II records the various heat treatments utilized and the resultant photochromic behavior obtained thereby. The glass plates may be heated at any rate to the selected temperature so long as thermal destruction is avoided. In general, the glass plate was placed directly into an electrically fired furnace operating at the desired temperature. At the conclusion of the heat treatment, the plates were taken out of the furnace and allowed to cool in the ambient environment.

A measure of the photochromic properties of a glass plate can be exhibited by determining the optical transmittance of the plate before and after exposure thereof for a specific period of time to actinic radiation and, again, after an interval of time subsequent to such exposure. In Table II, $T_o$ represents the initial visible transmission, expressed in percent, of the glass after heat treatment thereof, i.e., the transmission of the glass article to visible light after subjection to heat treatment but before exposure to actinic radiation. $T_{\infty}$ depicts the equilibrium transmission of the glass. Equilibrium transmission is defined herein as the transmission of the glass article to visible light after its exposure to actinic radiation of substantially constant intensity for a sufficient length of time to allow the transmission thereof the assume an essentially constant value. In the examples reported in Table II, a 10-minute exposure to ultraviolet radiation (3,650 A) produced by a commercial "Mineralite" long-wave ultraviolet lamp having a 9-watt input, the output being filtered to remove the major proportion of the visible energy, was arbitrarily considered to bring the article to equilibrium. $H_{fl}$ represents the half-fading time or the time in seconds after which the concentration of color centers after exposure to and removal from the actinic radiation is one-half that existing at equilibrium. Since the rate of fading assumes a logarithmic function, this expression supplies a meaningful measure of the rate at which a darkened glass fades or its ability to regain its original transmission to visible light. Each test was carried out at room temperature on polished samples about 1 ¼ inches × 1 ¼ inches × 2 mm. in thickness.

TABLE II

| Example No. | Heat Treatment | $T_o$ | $T_\infty$ | $H_n$ |
|---|---|---|---|---|
| 1 | 560°C. for 16 hours | 95% | 36% | 25 sec. |
| 1 | 600°C. for 2 hours | 96% | 38% | 20 sec. |
| 2 | 650°C. for 1 hour | 88% | 48% | 15 sec. |
| 3 | 650°C. for 1 hour | 89% | 50% | 20 sec. |
| 4 | 560°C. for 16 hours | 95% | 55% | 70 sec. |
| 4 | 650°C. for 1 hour | 95% | 60% | 81 sec. |
| 5 | 560°C. for 16 hours | 93% | 60% | 40 sec. |
| 5 | 650°C. for 1 hour | 94% | 66% | 45 sec. |
| 6 | 600°C. for 4 hours | 95% | 65% | 168 sec. |
| 6 | 650°C. for 1 hour | 93% | 58% | 116 sec. |
| 7 | 700°C. for 1 hour | 95% | 72% | 15 sec. |
| 8 | 600°C. for 4 hours | 97% | 69% | 114 sec. |
| 8 | 650°C. for 1 hour | 88% | 67% | 39 sec. |
| 9 | 650°C. for ½ hour | 91% | 61% | 200 sec. |
| 10 | 600°C. for 4 hours | 92% | 59% | 174 sec. |
| 11 | 650°C. for 1 hour | 93% | 55% | 160 sec. |
| 12 | 700°C. for ½ hour | 91% | 61% | 170 sec. |
| 13 | 650°C. for ½ hour | 88% | 45% | 154 sec. |
| 14 | 560°C. for 16 hours | 87% | 54% | 37 sec. |
| 14 | 650°C. for ½ hour | 96% | 57% | 72 sec. |
| 15 | 600°C. for ½ hour | 94% | 59% | 120 sec. |
| 15 | 600°C. for ¾ hour | 94% | 61% | 102 sec. |
| 16 | 600°C. for ¾ hour | 95% | 75% | 42 sec. |
| 16 | 600°C. for 2 hours | 95% | 73% | 36 sec. |
| 17 | 590°C. for 2 hours | 96% | 39% | 246 sec. |
| 18 | 600°C. for 1 hour | 95% | 22% | 276 sec. |
| 19 | 650°C. for ¾ hour | 94% | 38% | 198 sec. |
| 19 | 700°C. for ¾ hour | 94% | 57% | 279 sec. |
| 20 | 600°C. for 4 hours | 94% | 52% | 30 sec. |
| 21 | 560°C. for 16 hours | 95% | 32% | 27 sec. |
| 21 | 650°C. for 2 hours | 94% | 35% | 67 sec. |
| 22 | 600°C. for 2 hours | 95% | 35% | 204 sec. |

Table II illustrates the good photochromic properties which can be obtained through the heat treatment of glass articles having compositions within the ranges of this invention. A darkening of at least about 20 percentage points and a half-fading time of less than 5 minutes have arbitrarily been assumed to be practical requirements for the majority of applications for photochromic glasses. As can be seen from Table II, the examples recited therein more than comply with those parameters, many of them darkening more than 40 percentage points and having a half-fading time of less than one minute. The strain points of these glasses range about 475°–550° C., the annealing points about 510°–600° C., and the softening points about 750°–850° C.

Examinations of these photochromic articles employing electron microscopy and X-ray diffraction have confirmed the presence of silver chloride and/or silver bromide crystals. In transparent glasses, such as are illustrated in Examples 1–22, substantially all the crystals are smaller than 0.1 micron in diameter and many are smaller than 0.01 micron. These crystals comprise at least 0.005 percent by volume of the article.

Following the heat treating step to develop good photochromic properties in the glass plates, these plates were subjected to an ion exchange process to enhance the mechanical strength thereof. In carrying out this procedure, the photochromic plates treated as in Table II were plunged into baths of molten salts operating at temperatures below the strain points of the individual glasses. These salt baths contained monovalent cations having larger ionic diameters than the lithium and/or sodium ions in the glass. In most instances, a molten sodium salt was used and the exchange of sodium ions for lithium ions promoted thereby. A potassium salt bath was sometimes used to accomplish the exchange of lithium and sodium ions therefor and, very infrequently, a molten silver salt was employed to exchange with lithium and sodium ions. In general, the highest mechanical strengths are developed when the ion exchange is conducted at temperatures about 50°–150° C. below the strain point of the glass.

As has been observed above, the mechanical strength of a glass article is normally of little significance unless measured after the surface has been exposed to abrasion to simulate conditions approximating those which the glass might see in service. Therefore, various techniques have been devised by the art for simulating the abrasion received by glass articles in service. One technique which is believed to closely approximate rubbing abrasion and actual impact involves subjecting glass articles to a tumbling action. This "tumble abrasion" procedure comprises placing ten glass rods or canes, about 4 inches by ¼ inch diameter, in a Number 0 ballmill jar, adding 200 cc. of 30 grit silicon carbide particles, and then rotating the jar at 90–100 rpm for 15 minutes.

Table III reports the ion exchange treatments conducted on ¼ inch diameter canes following the heat treatment thereof to produce photochromic behavior therein and modulus of rupture values obtained in the conventional manner on these canes after tumble abrasion. These modulus of rupture measurements (average of five canes) are believed to define the "abraded strength" of the various glasses and reflect the useful or practical strength thereof.

TABLE III

| Example No. | Salt Bath | Exchange Treatment | MOR (psi) |
|---|---|---|---|
| 1 | $KNO_3$ | 4 hours at 540°C. | 37,000 |
| 1 | $AgNO_3$ | 4 hours at 320°C. | 35,000 |
| 2 | $NaNO_3$ | 4 hours at 450°C. | 38,000 |
| 2 | $NaNO_3$ | 2 hours at 450°C. | 31,000 |
| 3 | $NaNO_3$ | 4 hours at 400°C. | 38,000 |
| 3 | $NaNO_3$ | 2 hours at 450°C. | 34,000 |
| 4 | $NaNO_3$ | 4 hours at 400°C. | 34,000 |
| 4 | $NaNO_3$ | 2 hours at 450°C. | 25,000 |
| 5 | $NaNO_3$ | 4 hours at 400°C. | 37,000 |
| 5 | $NaNO_3$ | 2 hours at 450°C. | 29,000 |
| 6 | $NaNO_3$ | 4 hours at 450°C. | 32,000 |
| 6 | $KNO_3$ | 1 hour at 550°C. plus 4 hours at 460°C. | 28,000 |
| 7 | $NaNO_3$ | 4 hours at 400°C. | 37,000 |
| 7 | $NaNO_3$ | 2 hours at 450°C. | 32,000 |
| 8 | $NaNO_3$ | 3½ hours at 400°C. | 33,000 |
| 8 | $NaNO_3$ | 4 hours at 450°C. | 36,000 |
| 8 | $KNO_3$ | 1 hour at 550°C. plus 4 hours at 460°C. | 27,000 |
| 9 | $NaNO_3$ | 2 hours at 450°C. | 39,000 |
| 10 | $NaNO_3$ | 2 hours at 450°C. | 34,000 |
| 11 | $NaNO_3$ | 2 hours at 450°C. | 36,000 |
| 12 | $NaNo_3$ | 2 hours at 450°C. | 27,000 |
| 13 | $NaNO_3$ | 4 hours at 400°C. | 35,000 |
| 14 | $NaNO_3$ | 4 hours at 400°C. | 33,000 |
| 15 | $NaNO_3$ | 4 hours at 400°C. | 36,000 |
| 15 | $NaNO_3$ | 8 hours at 400°C. | 35,000 |
| 15 | $NaNO_3$ | 2 hours at 450°C. | 28,000 |
| 16 | $NaNO_3$ | 4 hours at 400°C. | 33,000 |
| 16 | $NaNO_3$ | 8 hours at 400°C. | 36,000 |
| 17 | $NaNO_3$ | 5½ hours at 375°C. | 40,000 |
| 17 | $NaNO_3$ | 8 hours at 450°C. | 39,000 |
| 18 | $NaNO_3$ | 6 hours at 375°C. | 41,000 |
| 18 | $NaNO_3$ | 4 hours at 400°C. | 36,000 |
| 19 | $NaNO_3$ | 4 hours at 450°C. | 24,000 |
| 20 | $NaNO_3$ | 4 hours at 450°C. | 26,000 |
| 21 | $KNO_3$ | 16 hours at 490°C. | 23,000 |
| 22 | $NaNO_3$ | 8 hours at 400°C. | 38,000 |

This Table clearly demonstrates that mechanical strengths several fold that exhibited by annealed glasses (commonly 5,000–8,000 psi) can be attained through the ion exchange strengthening of the photochromic glasses of the invention. Since this ion exchange is carried out at temperatures below the strain point of each glass, the photochromic properties thereof, previously induced through heat treatment at higher temperatures, are not affected significantly by the temperatures involved in the ion exchange although the fading rate appears to be improved somewhat. This is illustrated in Table IV where measurements of photochromic behavior were made on samples of Example 22 after heat treatment in air and again after a subsequent treatment in a $NaNO_3$ salt bath.

TABLE IV

| Thickness of sample | Heat treatment | $T_o$ | $T_\infty$ | $H_n$ |
|---|---|---|---|---|
| 0.250 in. | 630°C. for 1 hour | 95% | 28% | 300 sec. |
| 0.200 in. | 630°C. for 1 hour | 95% | 29% | 300 sec. |
| 0.140 in. | 630°C. for 1 hour | 94% | 32% | 288 sec. |
| 2 mm. | 630°C. for 1 hour | 94% | 42% | 225 sec. |
| | Salt treatment | $T_o$ | $T_\infty$ | $H_n$ |
| | 375°C. for 6 hours | 94% | 31% | 147 sec. |
| | 375°C. for 6 hours | 94% | 33% | 150 sec. |
| | 375°C. for 6 hours | 93% | 37% | 145 sec. |
| | 375°C. for 6 hours | 93% | 42% | 128 sec. |

In general, an ion exchange time of about 1-8 hours has been found sufficient to insure the development of high abraded strengths.

As was discussed above, photochromic glasses containing silver halides as the radiation-sensitive crystals can be produced where the base glass contains halides and the silver is introduced, normally in a surface layer only, through ion exchange occurring between silver ions from an external source replacing lithium and/or sodium ions in the glass structure. Although this technique adds a step to the stream of production and, hence, increases the cost of manufacture, several advantages result in employing this method rather than the batch process. First, the silver ion concentration can be maintained at a high value in a thin surface layer while the overall average concentration in a specific glass article can be much lower than that required in batch melting. Second, the surface concentration of silver can be simply adjusted. Third, the fading rate of the glass is increased. This third advantage is believed to be due to the fact that a smaller total number of radiation-sensitive crystals is required to provide the same degree of darkening as a body-crystallized article since the crystals can be concentrated in a shallow surface layer. Thus, there are fewer crystals which must return to their original, undarkened state.

In carrying out this embodiment of our invention, we have discovered that the same base glass must be utilized as that employed in the batch technique with the exception that silver may be completely omitted from the batch. Of course, silver may be utilized as a batch ingredient in an amount insufficient to produce the requisite number of silver halide crystals to impart photochromic behavior to the glass, but such practice is uneconomical. Hence, a batch for a glass composition consisting essentially, by weight on the oxide basis, of about 55–65% $SiO_2$, 15–25% $Al_2O_3$, 3–15% $R_2O$, where $R_2O$ consists of 0–5% $Li_2O$ and/or 0–10% $Na_2O$, 1–4% MgO, and at least one halide in the indicated amount selected from the group consisting of 0.3–2% Cl and 0.3–1% Br, is melted and this melt then cooled and shaped to a glass article of a desired configuration, the glass article is thereafter contacted with a silver-containing material at a temperature ranging between about 100° C. below the strain point of the glass to about 100° C. above the softening point of the glass for a sufficient length of time to effect an exchange of silver ions for lithium and/or sodium ions in a surface layer of the glass article and to react the migrating silver ions with the halide ions present in the glass to precipitate silver halide crystals. The manner and mechanism of this exchange are discussed in detail in the copending application, Ser. No. 509,164, mentioned hereinabove, and reference is hereby made to that application and the disclosed effective process parameters of the exchange reaction incorporated herein.

Table V records three glass compositions, which were melted in platinum crucibles at about 1,450° C. for about 6 hours. These compositions, as can be readily observed, fall within the same base glass ranges recorded above with respect to photochromic glasses produced by the batch method except that silver is absent. Glass canes about ¼ inch in diameter were drawn from each melt and the remainder thereof poured into patties about 1 ¼ inches × 1 ¼ inch × 2 mm. These patties were immediately transferred to an annealer and cooled therein to room temperature.

TABLE V

| | 23 | 24 | 25 |
|---|---|---|---|
| $SiO_2$ | 64.2% | 63.1% | 62.4% |
| $Al_2O_3$ | 20.5 | 19.2 | 21.8 |
| $Li_2O$ | 3.84 | 4.2 | 3.7 |
| $Na_2O$ | 6.1 | 8.2 | 7.2 |
| $B_2O_3$ | 3.34 | 3.2 | 2.9 |
| F | 1.43 | 1.48 | 1.42 |
| Cl | 0.59 | 0.62 | 0.58 |

These glasses demonstrated no photochromic behavior as formed nor after being subjected to a heat treatment such as was described above with respect to Examples 1–22. However, these glasses could be made to exhibit good photochromic properties through an ion exchange reaction with silver ions conducted in the manner disclosed in the above-mentioned application, Ser. No. 509,164.

In this thermally-induced ion exchange process, alkali metal ions from the glass are replaced by a corresponding number of silver ions from the contacting material to maintain a balance of electrical charges in the glass. And, since the ion exchange process is the result of thermal diffusion, the depth of the exchange is a function of the temperature employed as well as the time of treatment. Hence, the final product of the invention comprises a glass article having a central parent portion of the above-recited composition with at least a surface layer demonstrating a decrease in alkali metal ion content as compared with the parent glass but having an equivalent amount of silver ion content replacing the lost alkali metal ion content.

Because the ion exchange reaction is fundamentally a diffusion-type process wherein the amount of ion exchange per unit surface area exposed increases in proportion to the square root of the treating time at a constant temperature, the activating temperature should be as high as is practically feasible, but care being exercised with regard to thermal deformation of the glass article, thermal decomposition of the silver-containing contact material, and other thermally-induced adverse side effects. Hence, although the ion exchange is preferably undertaken at temperatures below the strain point of the glass to prevent deformation of the glass articles, temperatures above the softening point of the glass can be utilized. Thus, the ion exchange process can be carried out at temperatures ranging from about 100° C. below the strain point of the glass (375°–450° C.) to as high as 100° C. above the softening point of the glass (850°–950° C.). Since the depth of ion exchange is dependent upon the temperature employed and the time of treatment, the exchange schedule to be followed is governed by the depth of ion exchange layer necessary to produce the desired photochromic behavior in the glass. Hence, at the upper extreme of the effective temperature range, exposure for as little as 10 minutes may be satisfactory, while, at the lower extreme of the temperature range, a contact period of greater than 6 hours may be necessary to insure an effective exchange. Electron microscope examinations coupled with chemical analyses have demonstrated that this ion exchange can be effected to a depth of more than 100 microns within a reasonably short period of time.

The silver contacting material may be any stable ionized or ionizable composition containing silver ions including metallic silver, and may be in gaseous, liquid, or solid form. The preferred contact material is a molten bath of a silver salt, e.g., $AgNO_3$. Such baths may consist of a single silver salt, a mixture of silver salts, or a mixture of a silver salt and a diluent such as an alkali metal salt having the same cation as that in the glass.

Although these glasses may exhibit photochromic behavior after the ion exchange when the ion exchange is conducted at temperatures above the strain point of the glass, this behavior of the glass article can be improved by exposing the ion exchanged articles to the same kind of heat treatment in an inert atmosphere, such as air, as was described above with respect to Examples 1-22. Nevertheless, when the ion exchange is carried out below the strain point of the glass, these glasses do not exhibit photochromic behavior unless first subjected to a heat treatment at temperatures above the strain point of the glass.

Table VI reports various ion exchange treatments and subsequent heat treatments, where employed, and the photochromic properties obtained thereby. The heating rate employed in bringing the glass articles from room temperature to the salt bath temperatures does not appear to have any substantial effect upon the final results. The articles may be immersed directly into the bath operating at the desired temperature, where the dimensions and configuration of the articles are not such that breakage due to thermal shock will occur, or they may be heated at essentially any rate. Likewise, the ion exchanged articles may be cooled at substantially any rate which will preclude thermal breakage or the build-up of undesirable residual stresses therein.

In like manner, where a heat treatment is employed subsequent to the ion exchange, the glass articles may be heated at essentially any rate to the predetermined temperature that avoids thermal breakage. It is believed that this heat treatment in air allows the silver ions to diffuse more uniformly in the glass so as to provide a more homogeneous layer of photochromic glass.

TABLE VII

| Example No. | Salt Bath | Exchange Treatment | MOR (psi) |
|---|---|---|---|
| 23 | $NaNO_3$ | 2 hours at 400°C. | 32,000 |
| 24 | $NaNO_3$ | 2 hours at 425°C. | 28,000 |
| 25 | $NaNO_3$ | 3 hours at 400°C. | 35,000 |

This table clearly illustrates the great improvement in mechanical strength which can be realized through the ion exchange strengthening of the photochromic glass articles. Although it is possible to strengthen these glasses through an exchange with silver ions, the glass becomes quite stained from the extended contact with silver and, therefore, treatment with sodium and/or potassium ions is preferred.

It will be appreciated that it would be extremely advantageous to simultaneously develop photochromic properties and impart strengthening to the glass. However, photochromic behavior is dependent upon the diffusion of silver into the glass and the reaction thereof with halide to form silver halide crystals. This reaction takes place at temperatures above the strain point of the glass and for such lengths of time that the compressive stresses resulting from the exchange of silver ions for the lithium and/or sodium ions in the glass surface are relieved and essentially no strengthening effect is realized.

We claim:

1. A method for making essentially $B_2O_3$-free photochromic glass articles exhibiting very high mechanical strength after surface abrasion which comprises contacting photochromic glass articles having at least a surface layer consisting essentially, by weight on the oxide basis, of about 55-65% $SiO_2$,

TABLE VI

| Example No. | Salt bath treatment | Heat treatment | Percent T_o | Percent T_oo | H_ft (sec.) |
|---|---|---|---|---|---|
| 23 | 10 mole percent $AgNO_3$ / 90 mole percent $NaNO_3$ / 4 hours at 400° C. | 2 hours at 650° C. | 80 | 60 | 300 |
| 24 | 20 mole percent $AgNO_3$ / 80 mole percent $NaNO_3$ / 4 hours at 450° C. | ----do---- | 82 | 57 | 260 |
| 25 | 30 mole percent $AgNO_3$ / 70 mole percent $NaNO_3$ / 4 hours at 475° C. | ----do---- | 83 | 55 | 280 |

Table VI amply demonstrates the excellent photochromic properties that can be obtained in glass articles having base compositions within the ambit of this invention by subjecting them to a silver ion exchange process. Where the ion exchange temperature is lower than about 100° C. below the strain point of the glass, the replacement of alkali metal ions by silver ions is so slow as to be commercially uneconomical. Further, since etching and staining of the glass surface by the silver-containing materials can be a problem, it is advantageous to avoid long contact of the glass with these materials. Nevertheless, as has been explained above, where exchange temperatures much in excess of 100° C. above the softening point of the glass are employed, excessive deformation of the glass is a very real problem.

After the development of photochromic behavior in the glass articles, these articles were subjected to an ion exchange process similar to that discussed above with respect to Examples 1-22 to improve the mechanical strength thereof. Hence, the photochromic glasses of Table VI were plunged into baths of molten salts operating at temperatures below the strain points of the individual glasses.

Table VII records the ion exchange treatments carried out on ¼ inch diameter canes of Examples 23-25 which had been heat treated in accordance with that reported in Table VI to enhance photochromic behavior and modulus of rupture values obtained in the conventional manner on these canes after tumble abrasion. The modulus of rupture values reported represent an average of five measurements.

15-25% $Al_2O_3$, the ratio of $B_2O_3$, when present, to $Al_2O_3$ being less than 1:5, 3-15% $R_2O$, wherein $R_2O$ consists of an effective amount up to 5% $Li_2O$ and 0-10% $Na_2O$, 0.3-1.5% Ag, and at least one halide in the indicated amount selected from the group consisting of 0.3-5% Cl and 0-1% Br with a source of sodium ions at an elevated temperature but below the strain point of the glass to replace said lithium ions in a surface of the glass article with said sodium ions until this surface of the glass article is placed in compression to a depth of at least 5 microns.

2. A method according to claim 1 wherein said elevated temperature ranges about 50°-150° C. below the strain point of the glass.

3. A method for making an essentially $B_2O_3$-free photochromic glass article exhibiting very high mechanical strength after surface abrasion which comprises:

a. melting a batch for a glass composition consisting essentially, by weight on the oxide basis, of about 55-65% $SiO_2$, 15-25% $Al_2O_3$, the ratio of $B_2O_3$, when present, to $Al_2O_3$ being less than 1:5, 3-15% $R_2O$, wherein $R_2O$ consists of an effective amount up to 5% $Li_2O$ and 0-10% $Na_2O$, 0.3-1.5% Ag, and at least one halide in the indicated amount selected from the group consisting of 0.3-2% Cl and 0-1% Br;

b. simultaneously cooling said melt to a glass and forming a shape therefrom;

c. heating said glass shape in an inert atmosphere between the strain point and the softening point of the glass for a time sufficient to enhance the reaction of the silver ions with the halide ions;

d. contacting a surface of said glass shape with a source of sodium ions at an elevated temperature but below the strain point of the glass; and e. maintaining this contact for a sufficient length of time to effect an exchange of said sodium ions for said lithium ions and to place said surface of the glass shape in compression to a depth of at least 5 microns.

4. A method according to claim 3 wherein said glass shape is heated in an inert atmosphere for a time ranging about ½–12 hours.

5. A method according to claim 3 wherein a surface of said glass shape is contacted with a source of monovalent ions at a temperature ranging between 50°–150° C. below the strain point of the glass.

6. A method according to claim 1 wherein a surface of said glass shape is contacted with a source of sodium ions for about 1–8 hours.

7. A method for making an essentially $B_2O_3$-free photochromic glass article exhibiting very high mechanical strength after surface abrasion which comprises:

a. melting a batch for a glass composition consisting essentially, by weight on the oxide basis, of about 55–65% $SiO_2$, 15–25% $Al_2O_3$, the ratio of $B_2O_3$, when present, to $Al_2O_3$ being less than 1:5, 3–15% $R_2O$, wherein $R_2O$ consists of an effective amount up to 5% $Li_2O$ and 0–10% $Na_2O$, and at least one halide in the indicated amount selected from the group consisting of 0.3–2% Cl and 0–1% Br;

b. simultaneously cooling said melt to a glass and forming a shape therefrom;

c. contacting a surface of said glass shape with a silver-containing material selected from the group consisting of silver and stable silver compounds at a temperature ranging from about 100° C. below the strain point of the glass to about 100° C. above the softening point thereof;

d. maintaining this contact for a sufficient length of time to effect an exchange of silver ions for lithium and, when present, sodium ions in a surface layer of the glass shape and to cause a reaction of the silver ions with the halide ions present in the glass to precipitate silver halide crystals;

e. heating said glass shape in an inert atmosphere to a temperature between the strain point and the softening point of the glass for a time sufficient to enhance the migration of the silver ions in the surface of the glass shape to react with the halide ions present in the glass;

f. contacting surface of said glass shape with a source of sodium ions at an elevated temperature but below the strain point of the glass; and g. maintaining this contact for a sufficient length of time to effect an exchange of said sodium ions for said lithium ions and to place said surface of the glass shape in compression to a depth of at least 5 microns.

8. A method according to claim 7 wherein the time sufficient to effect an exchange of silver ions for lithium and, when present, sodium ions and to precipitate silver halide crystals ranges about 10 minutes to 6 hours.

9. A method according to claim 7 wherein the glass shape is heated in an inert atmosphere for a time ranging about ¼–12 hours.

10. A method according to claim 7 wherein a surface of said glass shape is contacted with a source of sodium ions at a temperature about 50°–150° C. below the strain point of the glass.

11. A method according to claim 7 wherein the time sufficient to effect an exchange of said sodium ions for said lithium ions ranges about 1–8 hours.

12. An essentially $B_2O_3$-free photochromic glass article exhibiting very high mechanical strength after surface abrasion containing silver halide crystals dispersed in a glassy matrix in an amount of at least 0.005 percent by volume and having a surface compressive stress layer of a depth of at least 5 microns and an interior tensile stress portion, said article containing ions of lithium and sodium, the concentration of the lithium ions being greater in said interior portion than in said surface layer and the concentration of the sodium ions being greater in said surface layer than in said interior portion, said interior portion having a composition consisting essentially, by weight on the oxide basis, of about 55–65% $SiO_2$, 15–25% $Al_2O_3$, the ratio of $B_2O_3$, when present, to $Al_2O_3$ being less than 1:5, 3–15% $R_2O$, wherein $R_2O$ consists of an effective amount up to 5% $Li_2O$ and 0–10% $Na_2O$, 0.3–1.5% Ag, and at least one halide in the indicated amount selected from the group consisting of 0.3–2% Cl and 0–1% Br.

13. A photochromic glass article according to claim 12 wherein said silver halide crystals are dispersed in said surface compressive stress layer only.

14. A photochromic glass article according to claim 12 wherein said composition of the interior portion also contains 0.3–1.5% Ag.

15. A photochromic glass article according to claim 12 wherein said silver halide crystals are dispersed throughout the entire article.

* * * * *